United States Patent
Francis et al.

(10) Patent No.: US 11,200,590 B2
(45) Date of Patent: Dec. 14, 2021

(54) SYSTEM FOR MONITORING A VENDING MACHINE

(71) Applicant: 365 Retail Markets, LLC, Troy, MI (US)

(72) Inventors: Chad Francis, Buckeye, AZ (US); Ralf Lindackers, Bloomfield Hills, MI (US); Joseph Hessling, Birmingham, MI (US)

(73) Assignee: 365 Retail Markets, LLC, Troy, MI (US)

( * ) Notice: Subject to any disclaimer, the term of this patent is extended or adjusted under 35 U.S.C. 154(b) by 0 days.

(21) Appl. No.: 16/425,032

(22) Filed: May 29, 2019

(65) Prior Publication Data

US 2019/0340638 A1 Nov. 7, 2019

Related U.S. Application Data

(63) Continuation of application No. 15/645,452, filed on Jul. 10, 2017, now abandoned.
(Continued)

(51) Int. Cl.
*G06Q 30/00* (2012.01)
*G06Q 30/02* (2012.01)
(Continued)

(52) U.S. Cl.
CPC ......... *G06Q 30/0237* (2013.01); *G06Q 20/18* (2013.01); *G06Q 20/327* (2013.01); *G06Q 20/36* (2013.01); *G07F 9/026* (2013.01)

(58) Field of Classification Search
CPC .... G06Q 20/32; G06Q 20/322; G06Q 10/087; G06Q 20/202; G06Q 20/18;
(Continued)

(56) References Cited

U.S. PATENT DOCUMENTS 8,744,939 B2 6/2014 Phillips et al.
9,240,007 B2 * 1/2016 Barragan Trevino ..... G07F 9/10
(Continued)

FOREIGN PATENT DOCUMENTS

WO WO-2006055450 A2 * 5/2006 ............. G07F 9/002

OTHER PUBLICATIONS

D. Minoli, Building the Internet of Things with IPv6 and MIPv6, John Wiley and Sons, 2013, pp. 1-86.
(Continued)

*Primary Examiner* — Waseem Ashraf
*Assistant Examiner* — Michael I Ezewoko
(74) *Attorney, Agent, or Firm* — Young Basile Hanlon & MacFarlane, P.C.

(57) ABSTRACT

A system for monitoring a vending machine is presented, the vending machine includes a controller and associated memory configured to store information associated with the condition of the vending machine. The vending machine also has a first short range transceiver configured to transmit the information associated with the condition of the vending machine, a first distance. A plurality of mobile devices each having a second short range transceiver and a first long range transceiver, the mobile devices configured to receive information associated with the condition of the vending machine and transmit it via the long range transceiver. A second long range transceiver is associated with a server coupled to the second long range transceiver. The server configured to receive the information associated with the condition of the vending machine, the server configured to send a signal to a subset of the plurality mobile device to induce the mobile device to be transported to within the first distance from the vending machine.

16 Claims, 5 Drawing Sheets

Related U.S. Application Data

(60) Provisional application No. 62/359,729, filed on Jul. 8, 2016.

(51) Int. Cl.
*G06Q 20/18* (2012.01)
*G06Q 20/36* (2012.01)
*G07F 9/02* (2006.01)
*G06Q 20/32* (2012.01)

(58) Field of Classification Search
CPC .. G06Q 20/204; G06Q 30/0237; G07F 9/023; G07F 9/026; G07F 9/002
See application file for complete search history.

(56) References Cited

U.S. PATENT DOCUMENTS

| | | |
|---|---|---|
| 9,965,768 B1 | 5/2018 | Doane et al. |
| 10,628,789 B2 * | 4/2020 | Hewett ................ G07F 9/001 |
| 2015/0100441 A1 | 4/2015 | Alarcon et al. |

OTHER PUBLICATIONS

S. Edelman, "Computing The Mind", Oxford University Press, 2008, pp. xi-36.

Lakoff et al. "Metaphors We Live By", University of Chicago Press, 1980, pp. ix-55.

E. Goffman, "An Essay on the Organization of Experience, Frame Analysis", Northeastern University Press, 1974, pp. 1-39, 301-344.

* cited by examiner

SYSTEM FOR MONITORING A VENDING MACHINE

CROSS-REFERENCE TO RELATED APPLICATIONS

This application is a continuation of U.S. patent application Ser. No. 15/645,452 filed Jul. 10, 2017, which claims the benefit of U.S. Provisional Application No. 62/359,729, filed on Jul. 8, 2016. The entire disclosure of each of the above applications is incorporated herein by reference.

FIELD

The present disclosure relates to vending machines and more particularly to a system for improving the frequency of monitoring a distributed set of vending machines.

BACKGROUND

This section provides background information related to the present disclosure which is not necessarily prior art.

Vending machines are point of sale locations where a retail transaction is completed, for example, using a machine to conduct the transaction. The vending machine, an amount due from the customer for the goods or services to be purchase is calculated, options for payment are provided, and a receipt for the transaction is issued. Typical point of sale vending machines are provided with dedicated terminals for self-service checkout, thereby lacking flexibility of use.

In addition, inventory management presents a challenge for businesses. Efficient inventory management requires oversight of the continuous flow of product into and out of an existing inventory. The management of inventory at a vending machine is difficult and presents an expense because a human is typically required to manage inventory and monies collected by the vending machine. Managing inventory typically requires one or more employees to dedicate time to physically locate and count product on hand, generate inventory reports, place purchase orders to replenish stock, and track the orders.

SUMMARY

Apparatuses, systems, and methods for a vending machine inventory monitoring are provided.

According to an aspect of the present inventive concept there is provided a system for using mobile devices to facilitate the collection of vending machine data. The system may include: a server that may execute a point-of-sale application; a mobile communication device that may execute a point-of-sale mobile application module; and wireless communication apparatuses that may enable communication between the server and the mobile communication device. The point-of-sale application and the point-of-sale mobile application module may perform check-out operations.

According to another aspect of the present inventive concept there is provided a method for conducting a purchase transaction using a wireless communication device. The method for conducting a purchase transaction using a wireless communication device may include: receiving from a mobile application module executing on a wireless communication device instructions to initiate a purchase transaction by a server application; verifying and authorizing the mobile application module by the server application; receiving from the mobile application module identification information about an item to be purchased to the server application; retrieving via the server application at least one of price and product information based on the identification information; and completing the purchase transaction by automatically electronically debiting a user account. And inducing users to bring their mobile devise to a vending machine to facilitate the transfer of information.

Other features and advantages of the present inventive concept should be apparent from the following description which illustrates by way of example aspects of the present inventive concept.

Further areas of applicability will become apparent from the description provided herein. The description and specific examples in this summary are intended for purposes of illustration only and are not intended to limit the scope of the present disclosure.

DETAILED DESCRIPTION

The drawings described herein are for illustrative purposes only of selected embodiments and not all possible implementations, and are not intended to limit the scope of the present disclosure.

Figure 1:
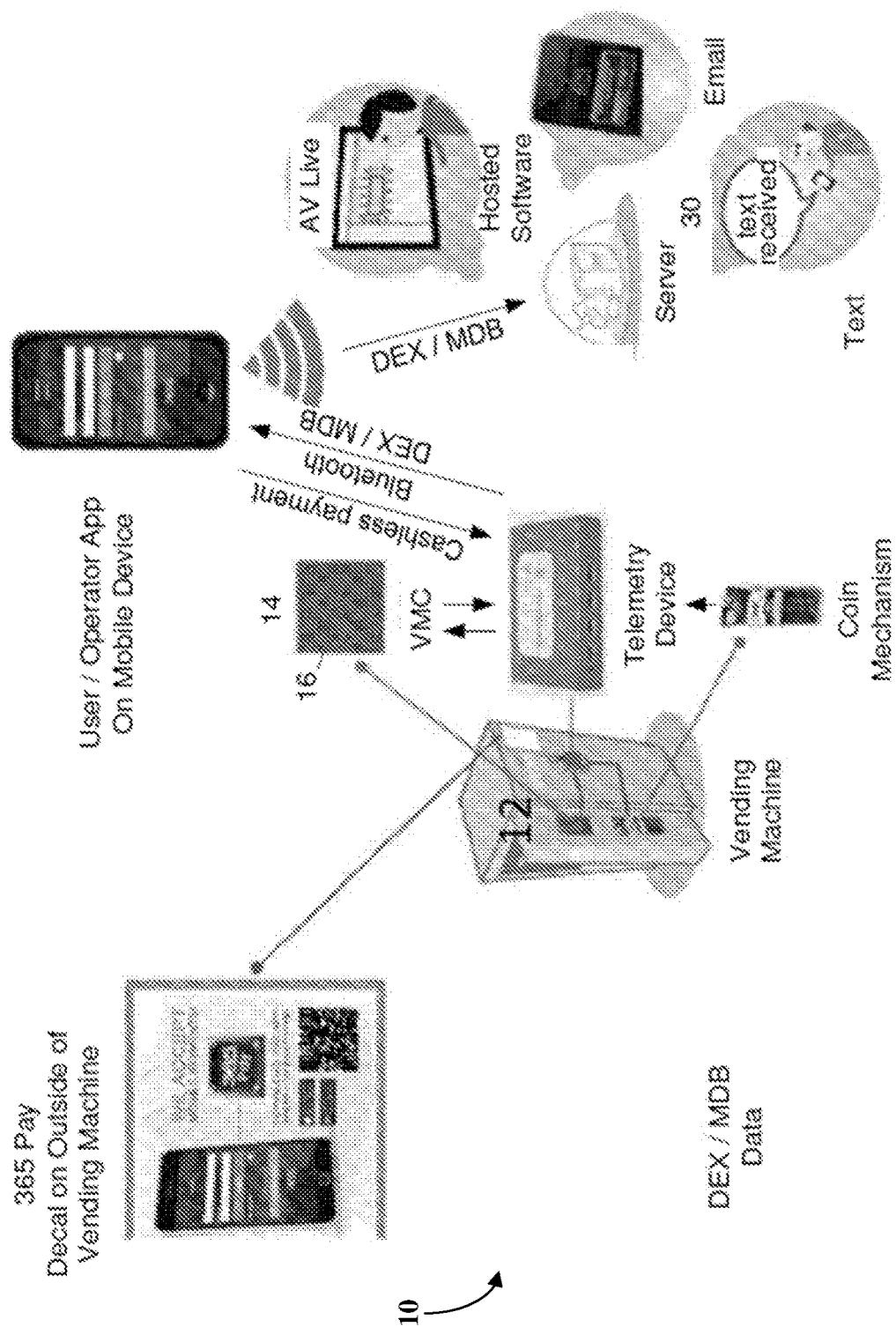
FIGS. 1 and 2 represent systems for monitoring vending machines according to the present teachings.
Figure 2:
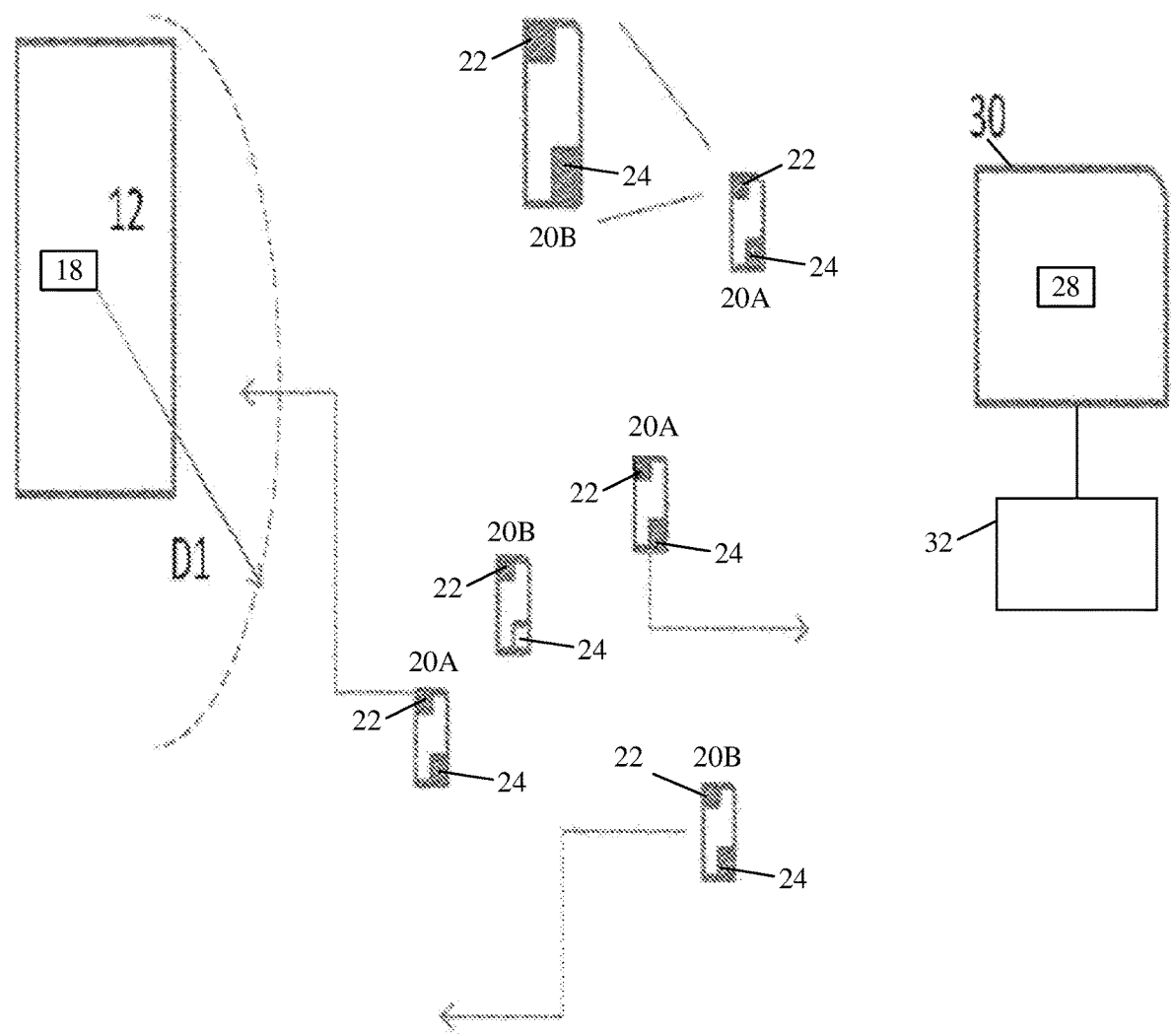

FIGS. 1 and 2 represent systems for monitoring vending machines according to the present teachings. Shown in the figures is a system 10 for monitoring a vending machine 12, a plurality of connected vending machines or a micromarket (all of which are herein labeled throughout a vending machine). The system can include what can loosely be thought of as containing a mesh network. The vending machine 12 includes a controller 14 and associated memory 16 configured to store information associated with the condition of the vending machine 12. The vending machine 12 also has a first short range transceiver 18 configured to transmit the information associated with the condition of the vending machine 12, a first distance D1. A plurality of mobile devices 20A and 20B each having a second short range transceiver 22 and a first long range transceiver 24. The mobile devices 20A are configured to receive information associated with the condition of the vending machine and transmit it via the first long range transceiver 24. A second long range transceiver 28; is associated with a server 30 coupled to the second long range transceiver 28. The server 30 is configured to receive the information associated with the condition of the vending machine 12, and transmit it to a system monitor 32 who is responsible for the maintenance and filling of a plurality of vending machines 12 located at different places.

Each mobile device has a software program which includes a circuit configured to facilitate a transaction of information between the vending machine 12 and the server 30. In this regard, the circuit is configured, optionally through the use of software, on the mobile device 20A to communicate with the vending machine controller 14 to transfer information through the mobile device to the server using the long and short range transceivers 18, 22, 24 and 28.

The software can be in the form of game or a digital wallet which facilitates the purchases at the vending machine. The digital wallet can store value for use with the machine or machines 12 and also can facilitate credit card purchases through the machine. The consumer facing wallet can accept payments using credit cards, or PayPal™. Additionally, as described below, the mobile device can be used to incentivize the user to move to with the Distance D1 to facilitate the transfer of data from the Vending machine to the server using messages sent to the user through the use of the long range transmitters and the software or circuit in the mobile device.

As the system is most efficient when information about the status of the machine is updated at regular pre-determined times, the server 30 is configured to monitor the timing of information retrieved through the system. In the event that data is not transmitted at regular intervals, the server 30 is configured to send a signal to a subset of the plurality mobile device 20A to induce a user to transport the mobile device to be transported to within the first distance from the vending machine. In this regard, the server can be configured to send a signal to an offer for a free or reduced price product from the vending machine. Additionally the server can send a signal with can be a piece of information that may be useful in for instance a game.

Once the user is within the distance D1 from the vending machine, the mobile device will facilitate the transfer of the vending machine status information in the form of a file such as a DEX file. The Short range transceiver can be for example a bluetooth enable system. The system can be associated with Micromarket systems where goods are sold via an un-attended terminal.

The server is a block diagram of an exemplary digital device. The digital device comprises a processor, a memory system, a storage system, a communication network interface, an I/O interface, and a display interface communicatively coupled to a bus. The processor is configured to execute executable instructions (e.g., programs). In some embodiments, the processor comprises circuitry or any processor capable of processing the executable instructions.

The memory system is any memory configured to store data. Some examples of the memory system are storage devices, such as RAM or ROM. The memory system may comprise the cache memory. In various embodiments, data is stored within the memory system. The data within the memory system may be cleared or ultimately transferred to the storage system.

The storage system is any storage configured to retrieve and store data. Some examples of the storage system are flash drives, hard drives, optical drives, and/or magnetic tape. The storage system may comprise non-transitory media. In some embodiments, the digital device includes a memory system in the form of RAM and a storage system in the form of flash data. Both the memory system and the storage system comprise computer readable media which may store instructions or programs that are executable by a computer processor including the processor.

The communication network interface (com. network interface) may be coupled to a network (e.g., network) via the link. The communication network interface may support communication over an Ethernet connection, a serial connection, a parallel connection, or an ATA connection, for example. The communication network interface may also support wireless communication (e.g., 802.11 a/b/g/n, WiMax). It will be apparent to that the communication network interface may support many wired and wireless standards.

The optional input/output (I/O) interface is any device that receives input from the user and output data. The optional display interface is any device that is configured to output graphics and data to a display. In one example, the display interface is a graphics adapter. It will be appreciated that not all digital devices comprise either the I/O interface or the display interface.

The hardware elements of the digital device are not limited to those depicted in FIG. 2. A digital device may comprise more or less hardware elements than those depicted. Further, hardware elements may share functionality and still be within various embodiments described herein. In example, encoding and/or decoding may be performed by the processor and/or a co-processor, such as a processor located on a graphics processing unit (GPU).

Figure 3:
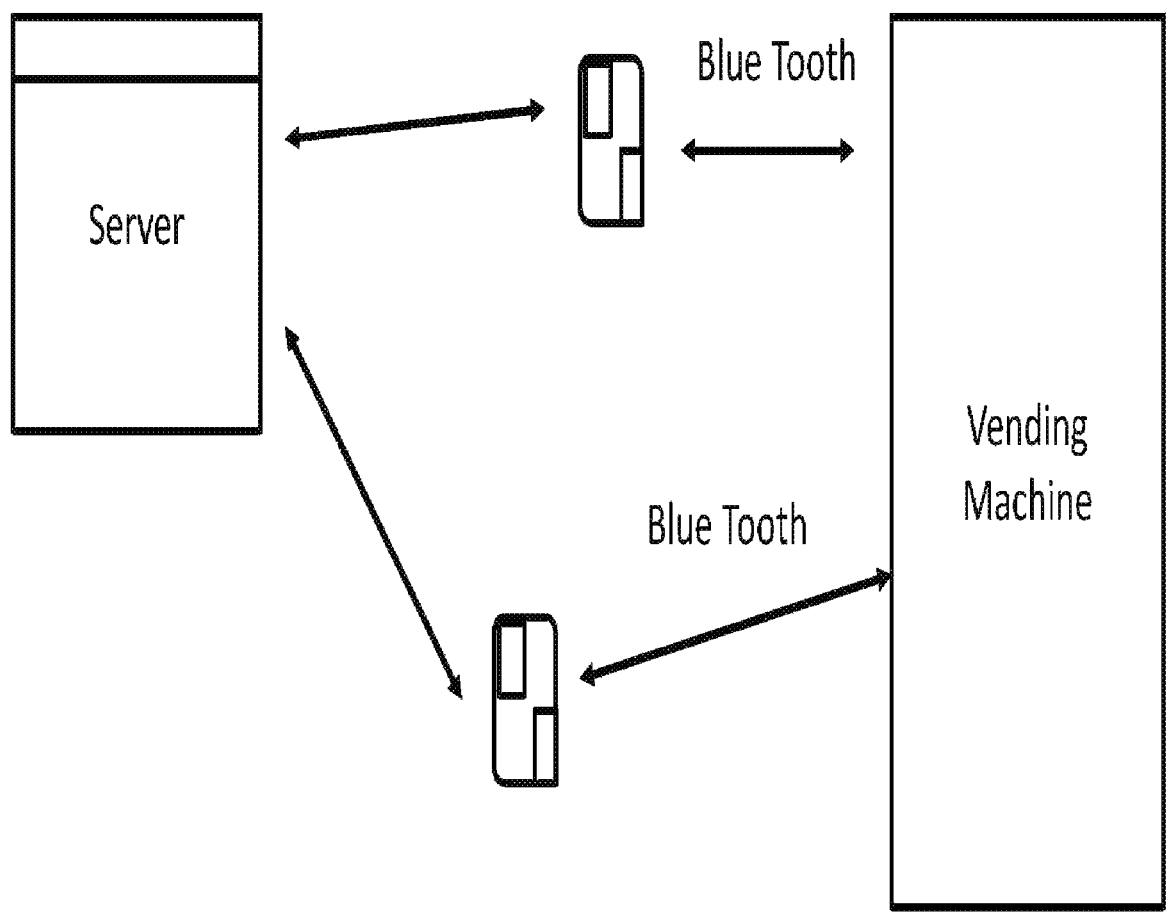
FIG. 3 represents a portion of the system shown in FIGS. 1 and 2.

FIG. 3 represents a portion of the system shown in FIGS. 1 and 2. The system can be based on a Linux based computing platform. This platform can be retrofitted inside any vending machines and interfaces with the vending machine software protocol MDB/DEX. The telemetry device module has 4× USB ports to connect peripheral components (USB Bluetooth/WiFi dongle). Primary telemetry device will communicate to a smartphone, described above as a 20A and 20B via Bluetooth/Wi-Fi, to an instruction set loaded into the smartphone. Using this mobile based software app the end-user can push a credit to the vending machine to purchase products. This software is configured to send a signal to the telemetry device which pushs a DEX handshake from the telemetry device to the vending machine controller. After the sending of the DEX handshake, the vending machine controller transfers the DEX file to the telemetry device. The telemetry device then sends data from the DEX file to the smartphone 20A, 20B via a short range transceiver such as Bluetooth or WiFi. This DEX file is then sent to the server via the long range transceiver.

The telemetry device further has a 2-way communication system which gives cash/cashless sales which need an MDB code to allow for selection mapping. The telemetry device further has a service application which allows for the setup, configuration, and the download of DEX files. Further, the telemetry device listens to the market application to give credit to the vending machine, send over transaction data, and send DEX data.

The device 20A has software which allows the ability to setup and account and to load money into the account. The software further is configured to allow the input of a coupon. Optionally, the smartphone will allow a planogram of items from the vending machine.

Figure 4:
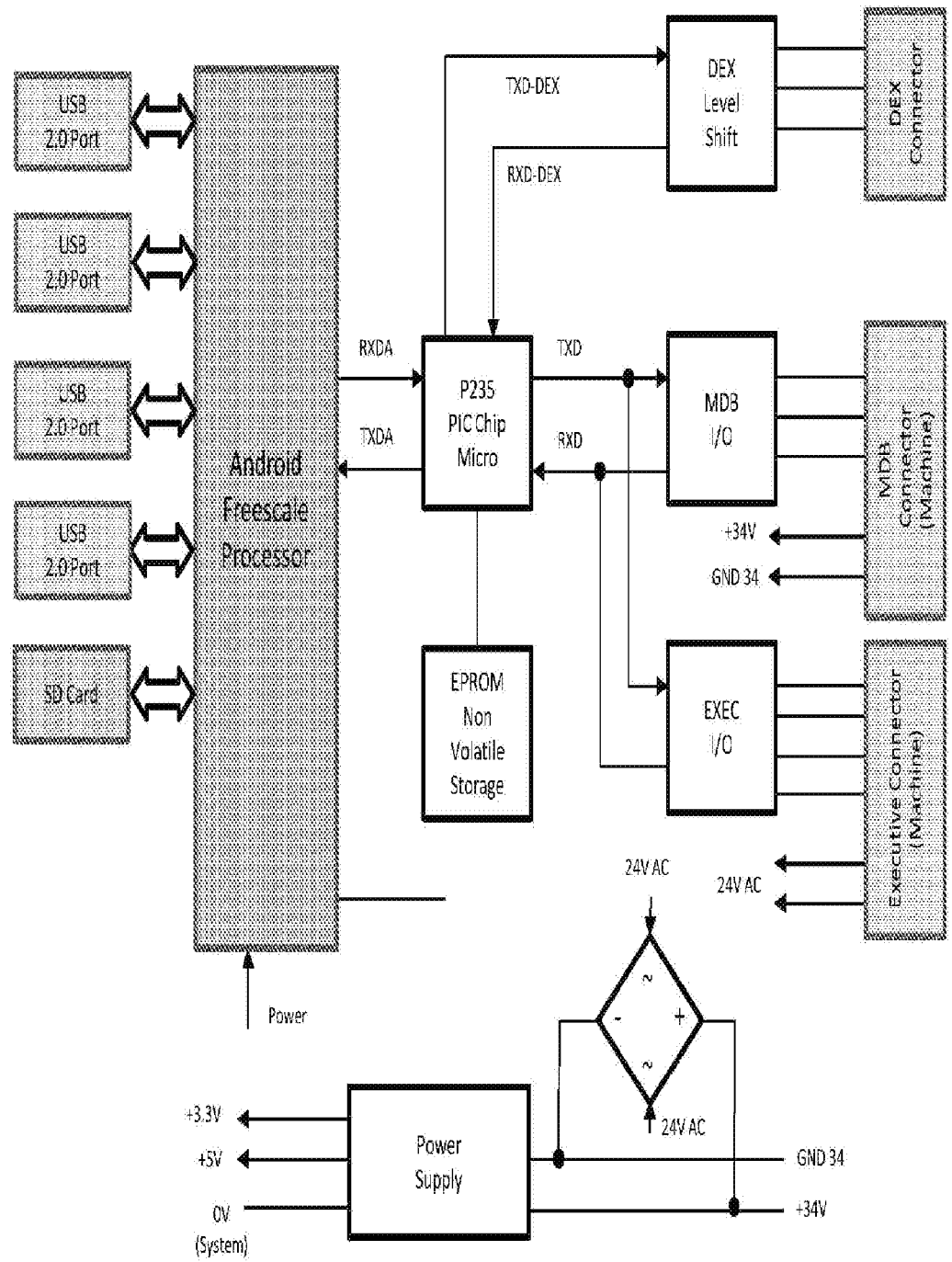
FIG. 4 represents a block diagram of the telemetry device shown in FIGS. 1-3.

FIG. 4 represents a block diagram of the telemetry device shown in FIGS. 1-3. The Telemetry device can be a Linux based computing platform which can be retrofitted using adaptive cabling inside vending machines having vending machine software protocol MDB/DEX. The telemetry device has 4× USB ports to connect peripheral components (USB Bluetooth/WiFi dongle). As descried above, the telemetry device will communicate to a smartphone via Bluetooth/Wi-Fi to smartphones through a software application stored on the smart phone. These applications will receive information from the telemetry module and store it in memory on the smart phone device. This data (for example the DEX data) will be forwarded using the long distance transceiver, through the telephone networks. Using a mobile based software application the end-user can push a credit to the vending machine to purchase products. The block diagram shows major building blocks of the telemetry device. Shown is the vending machine interface (DEX/MDB) to the Android processor connection. These building blocks shall be integrated on the main PCB as much as possible.

Figure 5:
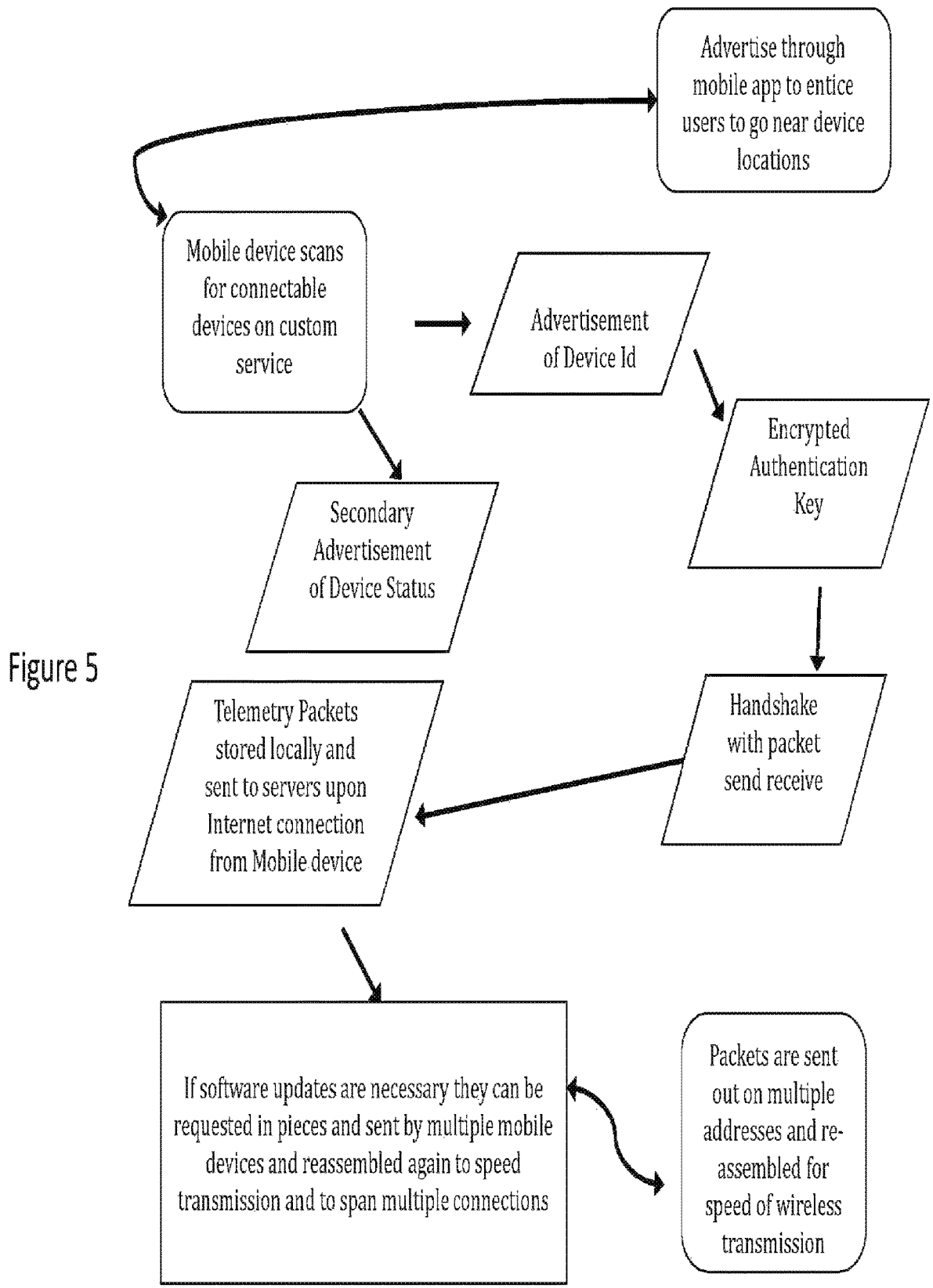
FIG. 5 represents a flow chart describing the flow of information shown in FIGS. 1-4.

FIG. 5 represents a flow chart describing the flow of information shown in FIGS. 1-4. The mobile device 20a scans using Bluetooth or Wi-Fi for connectable devices on the service. In the event that no vending machines or devices are in the area, the app will attempt to entice the user to approach a machine. In this regard, the device may show the location of the closest machine, or offer a coupon or free product as described above. Secondarily, if a vending machine is available, the mobile device 20a will forward a Device ID and encrypted authentication key. At this point, a handshake between the mobile device 20a and the telemetry device occurs with a packet send/receive. The telemetry Packets are stored locally and sent to servers upon internet connection from the mobile device. To increase the speed of transmission, the packets can be sent out on multiple addresses and reassembled. To update software on either the mobile device or the telemetry device, portions of the updated software can be sent through the telecommunications system and the near field transceiver. These portions can be reassembled and installed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In the foregoing description, the teachings have been described with reference to specific exemplary embodiments thereof. It will be apparent to those skilled in the art that a person understanding these teachings may conceive of changes or other embodiments or variations, which utilize the principles of these teachings without departing from the broader spirit and scope of the teachings. The specification and drawings are, therefore, to be regarded in an illustrative rather than a restrictive sense.

What is claimed is:

1. A method for transmitting indications of a status of a vending machine to a server device using a mobile device intermediary to the vending machine and the server device, the method comprising:

configuring a telemetry device coupled to the vending machine to transmit, using a plurality of mobile devices including the mobile device, an indication of the status of the vending machine to the server device at fixed intervals, wherein the server device receives the transmissions from the telemetry device at the fixed intervals;

transmitting a message from a long-range transceiver of the server device to long-range transceivers of the plurality of mobile devices, the message including a request to relocate the plurality of mobile devices to a location proximate to the vending machine;

after the message is transmitted from the long-range transceiver of the server device, using a short-range transceiver of the telemetry device and a short-range transceiver of the mobile device to detect that the mobile device is at the location proximate to the vending machine; and in response to the telemetry device detecting that the mobile device is at the location proximate to the vending machine, causing a long-range transceiver of the mobile device, as an intermediary, to transmit the indication for a current fixed interval of the fixed intervals from the telemetry device to the long-range transceiver of the server device by:
    transmitting, from the telemetry device, a first signal indicating to establish a handshake with a controller of the vending machine;
    receiving, at the telemetry device, a second signal including the indication from the controller of the vending machine using the handshake established between the telemetry device and the controller of the vending machine; and
    transmitting, from the telemetry device, the second signal to the mobile device,
    wherein the handshake established between the telemetry device and the controller of the vending machine is a DEX handshake, and wherein the second signal includes a DEX file.

2. The method of claim 1, further comprising:
    receiving, at the telemetry device, a third signal for establishing a handshake with the mobile device from the mobile device; and
    receiving, at the telemetry device, the first signal indicating to establish the handshake with the controller of the vending machine using the handshake established between the telemetry and the mobile device.

3. The method of claim 1, wherein configuring the telemetry device to transmit the indication of the status of the vending machine to the server device at the fixed intervals comprises:
    configuring the telemetry device using a service application running on the telemetry device.

4. The method of claim 1, wherein communications between the mobile device and the telemetry device use a short range transmission protocol, wherein communications between the mobile device and the server device use a long range transmission protocol.

5. A system for transmitting indications of a status of a vending machine to a server device using a mobile device intermediary to the vending machine and the server device, the system comprising:
    the server device; and
    a telemetry device coupled to the vending machine, the telemetry device configured to use a plurality of mobile devices including the mobile device to transmit an indication of the status of the vending machine to the server device at fixed intervals,
    wherein the server device is configured to transmit, to the plurality of mobile devices, a message to relocate the plurality of mobile devices to a location proximate to the vending machine,
    wherein the telemetry device is configured to detect whether the mobile device is at the location proximate to the vending machine after the message is transmitted from the server device, and
    wherein the telemetry device is configured to use the mobile device to transmit the indication for a current fixed interval of the fixed intervals to the server device in response to the telemetry device detecting that the mobile device is at the location proximate to the vending machine by:
        transmitting, from the telemetry device, a first signal indicating to establish a handshake with a controller of the vending machine;
        receiving, at the telemetry device, a second signal including the indication from the controller of the vending machine using the handshake established between the telemetry device and the controller of the vending machine; and
        transmitting, from the telemetry device, the second signal to the mobile device,
    wherein the handshake established between the telemetry device and the controller of the vending machine is a DEX handshake, and wherein the second signal includes a DEX file.

6. The system of claim 5, wherein the telemetry device includes serial bus ports used for connecting peripheral components to the telemetry device.

7. The system of claim 6, wherein the peripheral components include a short range transceiver that enables the use of a short range transmission protocol.

8. The system of claim 7, wherein communications between the mobile device and the telemetry device use a short range transmission protocol, wherein communications between the mobile device and the server device use a long range transmission protocol.

9. The system of claim 5, wherein the telemetry device is configured to establish a second handshake with a controller of the vending machine based on the signal.

10. The system of claim 5, wherein the message includes location information associated with the vending machine.

11. An apparatus for updating a status of a vending machine based on indications of the status transmitted by a telemetry device coupled to the vending machine using a mobile device intermediary to the vending machine and the apparatus, the apparatus comprising:
    a memory; and
    a processor configured to execute instructions stored in the memory to:
        receive the indication of the status of the vending machine from the telemetry device coupled to the vending machine at fixed intervals, wherein the telemetry device transmits the indication using a plurality of mobile devices including a mobile device;
        transmit, to the plurality of mobile devices, a message to relocate the plurality of mobile devices to a location proximate to the vending machine, wherein the telemetry device is configured to detect whether the mobile device is at a location proximate to the vending machine after message is transmitted and to use the mobile device as an intermediary to transmit the indication for a current fixed interval of the fixed intervals in response to detecting that the mobile device is at the location proximate to the vending machine by:
            transmitting, from the telemetry device, a first signal indicating to establish a handshake with a controller of the vending machine;
            receiving, at the telemetry device, a second signal including the indication from the controller of the vending machine using the handshake established between the telemetry device and the controller of the vending machine; and
            transmitting, from the telemetry device, the second signal to the mobile device, wherein the handshake established between the telemetry device and the controller of the vending machine is a DEX handshake, and wherein the second signal includes a DEX file;
        receive the indication for the current fixed interval after transmitting the message to the mobile device; and
        update the status of the vending machine based on the received indication for the current fixed interval.

12. The apparatus of claim 11, wherein the instructions include instructions to collect, at the fixed intervals, status information for a plurality of vending machines including the vending machine.

13. The apparatus of claim 11, wherein the instructions to transmit the message to the mobile device include instructions to transmit the message to the plurality of mobile devices.

14. The apparatus of claim 11, wherein the message includes location information associated with the vending machine.

15. The apparatus of claim 11, wherein communications with the mobile device use a long range transmission protocol.

16. The apparatus of claim 11, wherein the indication for the current fixed interval is included in the DEX file.

\* \* \* \* \*